US008555192B2

(12) United States Patent
Cao et al.

(10) Patent No.: US 8,555,192 B2
(45) Date of Patent: Oct. 8, 2013

(54) SKETCHING AND SEARCHING APPLICATION FOR IDEA GENERATION

(75) Inventors: Xiang Cao, Cambridge (GB); John Helmes, Cambridge (GB); Abigail Sellen, Cambridge (GB); Richard Banks, Egham (GB)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 12/792,960

(22) Filed: Jun. 3, 2010

(65) Prior Publication Data

US 2011/0302522 A1 Dec. 8, 2011

(51) Int. Cl.
*G06F 3/048* (2013.01)
(52) U.S. Cl.
USPC .......................... 715/780; 715/764; 715/778
(58) Field of Classification Search
USPC .......................................... 715/780, 778, 764
See application file for complete search history.

(56) References Cited

U.S. PATENT DOCUMENTS

| | | | |
|---|---|---|---|
| 6,269,358 B1 * | 7/2001 | Hirata ................................. | 1/1 |
| 6,781,069 B2 * | 8/2004 | Silverstein et al. ......... | 178/18.01 |
| 6,791,530 B2 * | 9/2004 | Vernier et al. ................ | 345/156 |
| 7,327,376 B2 | 2/2008 | Shen et al. | |
| 7,458,013 B2 * | 11/2008 | Fruchter et al. ............... | 715/203 |
| 7,508,354 B1 * | 3/2009 | Sanders et al. ................. | 345/1.1 |
| 7,756,339 B2 * | 7/2010 | Bober et al. .................. | 382/190 |
| 7,877,414 B2 * | 1/2011 | Bober ........................... | 707/791 |
| 7,913,162 B2 * | 3/2011 | Hansen et al. ................ | 715/230 |
| 7,940,987 B2 * | 5/2011 | Bober et al. .................. | 382/190 |
| 8,090,715 B2 * | 1/2012 | Matias .......................... | 707/726 |
| 8,201,107 B2 * | 6/2012 | Chevalier et al. ............ | 715/861 |
| 2003/0070140 A1 | 4/2003 | Sneh | |

OTHER PUBLICATIONS

David, et al., "CoSke: An Exploration in Collaborative Sketching", retrieved on May 11, 2010 at <<http://research.microsoft.com/en-us/um/redmond/groups/connect/CSCW_10/docs/p471.pdf>>, ACM, Posters at the Conference on Computer Supported Cooperative Work (CSCW), Savannah, GA, Feb. 6, 2010, pp. 471-472.

Hinckley, "InkSeine, Rethink Your Ink, What Makes InkSeine unique?", retrieved on Jun. 2, 2010 at <<http://research.microsoft.com/en-us/um/redmond/projects/inkseine/Features.html>>, Microsoft Corporation, 2010, pp. 1-7.

(Continued)

*Primary Examiner* — David Phantana Angkool
(74) *Attorney, Agent, or Firm* — Zete Law, P.L.L.C.; MacLane C. Key

(57) ABSTRACT

A sketching and searching application for idea generation is described. In an embodiment, a software application is described which has a user interface which comprises a sketching area. When a user draws or annotates a sketch in the application, the application automatically searches for images based on the sketch and displays results in the form of images outside the sketching area. These images are used to inspire new ideas and to facilitate the creative process in a way that is closely linked with the sketching process. When the sketch is updated, additional searching is automatically performed and new results are displayed. In some examples the sketching area is deformable and deformation may cause new results to be displayed and in some examples the user is able to drag image results into the sketching area to enable tracing of the image or to include the image in the sketch.

20 Claims, 11 Drawing Sheets

(56) References Cited

OTHER PUBLICATIONS

Jiang, et al., "COSINE: A Sketch-Based Interactive Environment for Cooperative Design", retrieved on May 11, 2010 at <<http://ieeexplore.ieee.org/stamp/stamp.jsp?tp=8,arnumber=40191828,userType=inst>>, IEEE Press, Proceedings of Conference Computer Supported Cooperative Work (CSCW), Nanjing, CN, 2006, pp. 348-353.

Laybourne, "Ideation and Brainstorming Techniques", retrieved on May 11, 2010 at <<http://www.mediachops.com/producer_chops/3_Talks/PDFs/Ideation%20&%20Brainstorming%20Technique.pdf>>, Apr. 4, 2006, pp. 1-3.

"User Experience driven development", retrieved on May 11, 2010 at <<http://www.forum.nokia.com/Technology_Topics/Design_and_User_Experience/Conceptual_Design.xhtml>>, Nokia, 2010, pp. 1-3.

van der Lugt, "Functions of Sketching in Design Idea Generation Meetings", retrieved on May 11, 2010 at http://delivery.acm.org/10.1145/590000/581723/p72-vanderlugt.pdf?key1=581723&key2=7754653721&coll=GUIDE&dl=GUIDE&CFID=89895510&CFTOKEN=31869538>>, ACM, Proceedings of Conference on Creativity and Cognition, Loughborough, UK, 2002, pp. 72-79.

van der Lugt, "How sketching can affect the idea generation process in design group meetings", retrieved on May 11, 2010 at >>http://www.lib.yuntech.edu.tw/exam_new/98/drde.pdf>>, 2005, pp. 1-3.

Wang, et al., "Idea Expander: Supporting Group Brainstorming with Conversationally Triggered Visual Thinking Stimuli", retrieved on May 11, 2010 at <<http://research.microsoft.com/en-us/um/redmond/groups/connect/CSCW_10/docs/p103.pdf>>, ACM, Conference on Computer Supported Cooperative Work (CSCW), Feb. 2010, Savannah, GA, pp. 103-106.

Xu, et al., "Sketch-based User Interface for Creative Tasks", retrieved on May 11, 2010 at http://www.cs.virginia.edu/~xj3a/research/publications/APCHI02.pdf>>, Proceedings of Asia Pacific Conference on Computer Human Interaction (APCHI), Nov. 2002, pp. 560-570.

\* cited by examiner

SKETCHING AND SEARCHING APPLICATION FOR IDEA GENERATION

BACKGROUND

Ideas are commonly generated using a collaborative process known as brainstorming in which a group of people spontaneously share solutions to a problem. The process is intended to generate a large number of ideas which can subsequently be analyzed and refined. There are a number of tools which are available to assist in creative thinking activities, such as brainstorming, and these tools include sets of cards containing key words which are intended to stimulate new directions for thought. There are a number of different sets of cards and one example is Harvey cards which include key words such as 'contradict', 'superimpose' and 'distort'. Designers may also use 'mood boards' that contain a collection of images which may provide inspiration and assist in generating new ideas.

Once ideas have been generated, there are many computer design tools which enable a user to record their ideas, such as sketching and other CAD (computer aided design) applications; however such tools do not provide any assistance in actually developing ideas.

The embodiments described below are not limited to implementations which solve any or all of the disadvantages of known design tools.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A sketching and searching application for idea generation is described. In an embodiment, a software application is described which has a user interface which comprises a sketching area. When a user draws or annotates a sketch in the application, the application automatically searches for images based on the sketch and displays results in the form of images outside the sketching area. These images are used to inspire new ideas and to facilitate the creative process in a way that is closely linked with the sketching process. When the sketch is updated, additional searching is automatically performed and new results are displayed. In some examples the sketching area is deformable and deformation may cause new results to be displayed and in some examples the user is able to drag image results into the sketching area to enable tracing of the image or to include the image in the sketch.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
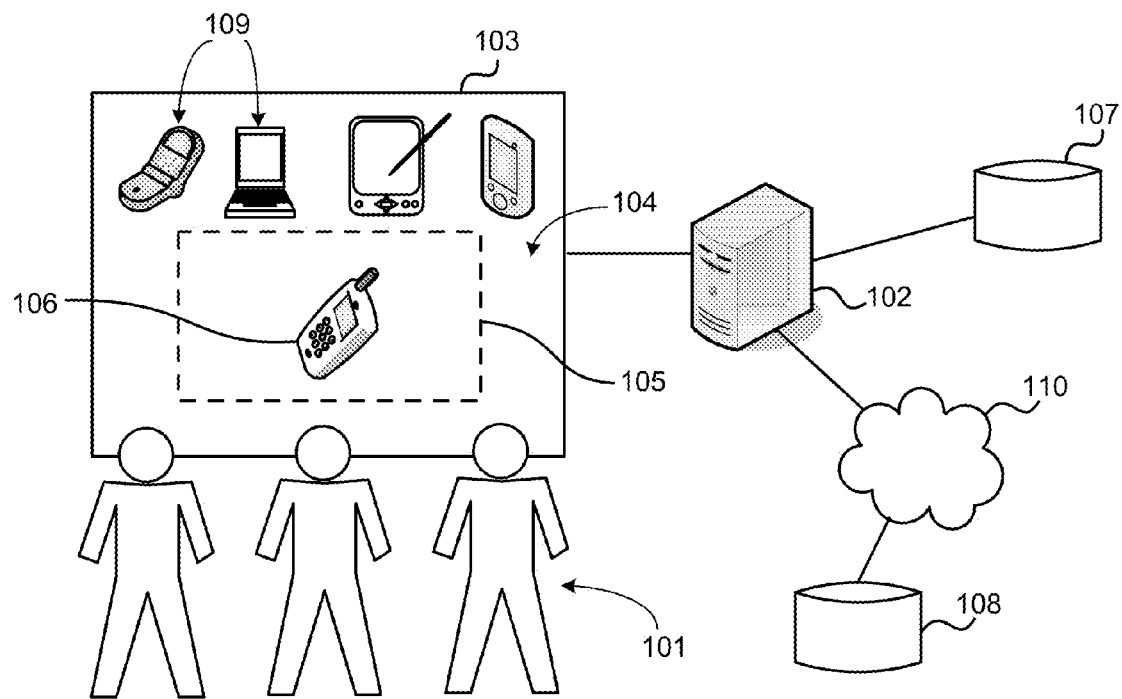
FIG. 1 is a schematic diagram of an example idea generation application in use.
Figure 2:
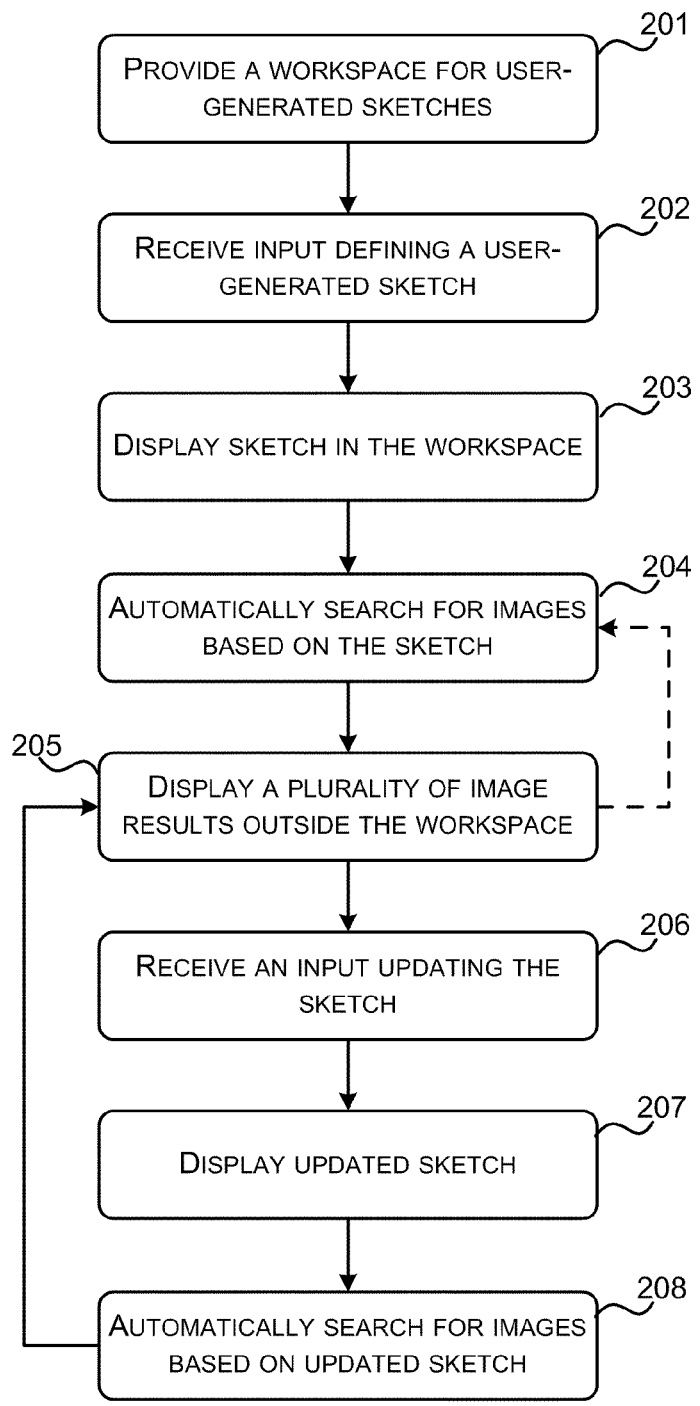
FIG. 2 is a flow diagram of an example method of operation of an idea generation application.

FIG. 1 is a schematic diagram of an example idea generation application in use and FIG. 2 is a flow diagram of an example method of operation of the idea generation application. In the example shown, a number of users 101 are interacting with the application which runs on a computer 102 which is connected to a large interactive display 103 such as a large touch-sensitive display or interactive white board (also known as a smart board). The application provides a graphical user interface (GUI) 104 which includes a workspace for sketching (block 201 in FIG. 2, where the workspace is indicated by the dotted outline 105 in FIG. 1). The users can use any user input device to draw a sketch and in the example shown, the users 101 may use the interactive display 103 to provide an input to the application which defines a user-generated sketch 106 (received in block 202 and displayed in block 203). In response to receiving the input defining the user-generated sketch (in block 202), the application automatically searches for images based on the sketch (block 204). The search may search in any location for the images, for example in a particular database 107 (which may comprise a local library of images) or online repository 108 (e.g. Bing™ or YouTube(trade mark)), or the search may be a more broad search for images on the interne 110 and this may be fixed within the application or specified by a user. Where a search uses multiple image repositories, a user may define a preference for displaying results from particular sources etc.

The sketching which is done by a user in the idea generation application described herein, is part of the natural process of idea generation and exploration and is not done intentionally to perform a search, as is the case in sketch-based searching applications. The searching is performed automatically within the idea generation application based on the search and the user is not required to push a button (or other control) to trigger the search.

Having performed the search (in block 204), results in the form of images 109 are displayed in the graphical user interface 104 outside the workspace 105 (block 205) and these results may be referred to as 'content' or 'inspiration content'. The content (e.g. images 109) which is displayed may, for example, include images which are visually similar to the sketch (e.g. a similar shape) and/or may include images of a similar object (e.g. other telephones which may be different shapes). As there is a degree of ambiguity around image searching, the content may also include images which are different from the sketch and potentially some surprising results that appear unconnected to the sketch. The purpose of the content is to provide triggers for further creative thinking on the part of the users and therefore any different or surprising results may be beneficial in providing inspiration. Furthermore, in some examples, the search may include a component which searches for non-similar images or performs other faceted searches (as described in more detail below) in order to provide content which encourages a user to think laterally or in another direction.

When a user updates the sketch (in the form of an input received by the application in block 206 which causes the displayed sketch to be updated in block 207), the application automatically performs additional searching (in block 208) based on the updated sketch and again displays results outside the workspace (block 205). The method is repeated (blocks 205-208) to provide dynamically changing content in response to changes in the user-generated sketch. The content displayed in response to additional searches may be shown in addition to the content from previous searches or may replace some/all of the earlier content. Furthermore the additional searches may be performed based on the entire updated sketch or based on the particular change that has been made to the sketch. In some examples, the content displayed may be updated even if the sketch is not updated by a user, as indicated by the dotted arrow from block 205 to block 204.

Although FIG. 2 shows a linear process, some of the method steps may be performed concurrently. For example, the searching (performed in blocks 204 and 208) and display of search results (in block 205) may be considered as operating substantially continuously in the background of the sketching application (as the user creates the initial sketch, blocks 202-203 and then updates the sketch, blocks 206-207). A user sketch in a continuous process and as they do so, the content displayed may change in a substantially continuous manner (although in other examples, it may change periodically). A user is not required to push a button to trigger the searching but the searching is instead performed automatically and in some cases, substantially continuously.

The idea generation application described herein automatically and dynamically provides creativity triggers, in the form of the image results, to a user (or group of users) as they sketch out an idea within the workspace. The images are provided in real time and are in the spatial vicinity of the search. The application therefore enables users to leverage one or more different sources of digital material to stimulate their creative thinking process and where the content displayed is updated, the application provides triggers such that a user is continuously inspired throughout the whole ideation/sketching process (rather than only in certain stages or when specifically requested by the user). Different search criteria may be used when performing searches to provide different types of triggers and this is described in more detail below. Through use of images as triggers, a user does not need to view the content in detail (e.g. as would be the case if text was displayed).

The term 'image' is used herein in a broad sense to include digital still images such as photographs, video stills, graphics, sketches or other digital 2D images, as well as sequences of images such as videos, or other captured or generated sequences of images. The term may also encompass medical images such as CT scans, MRI scans or other digital medical images, digital 3D images or higher dimensional images such as obtained from Z-cameras, voxel volumes, satellite imaging systems, ultra-sound scans, etc; however these are less likely to provide useful inspirational content.

Where the results includes video clips, the clips may play automatically and once finished the same clip may be repeated or the piece of content replaced by another search result (from the same search or from a new search) and if this is a video this may play automatically.

Although FIG. 1 shows the application running on a computer 102 connected to a large interactive display 103, the application may alternatively run on any computing device with any kind of display apparatus, and particularly on devices which use finger or stylus input (and which may provide multi-touch input) rather than the traditional mouse and keyboard user inputs. The use of a large interactive display, as shown in FIG. 1, may be suited to use by multiple users. Where there are multiple users, they may be co-located and viewing the application via the same display (as shown in FIG. 1) or they may be collaborating remotely via a shared display space, where the application may be running on a server. In another example, the application may run on a slate or tablet PC (which comprises a touch-sensitive display) and this may be more suited to use by a single user. In a further example, a smaller form factor device, such as a mobile telephone or handheld games console may be used. Although FIG. 1 shows multiple users 101, the application described herein may be used by one user or by more than one user.

Figure 3:
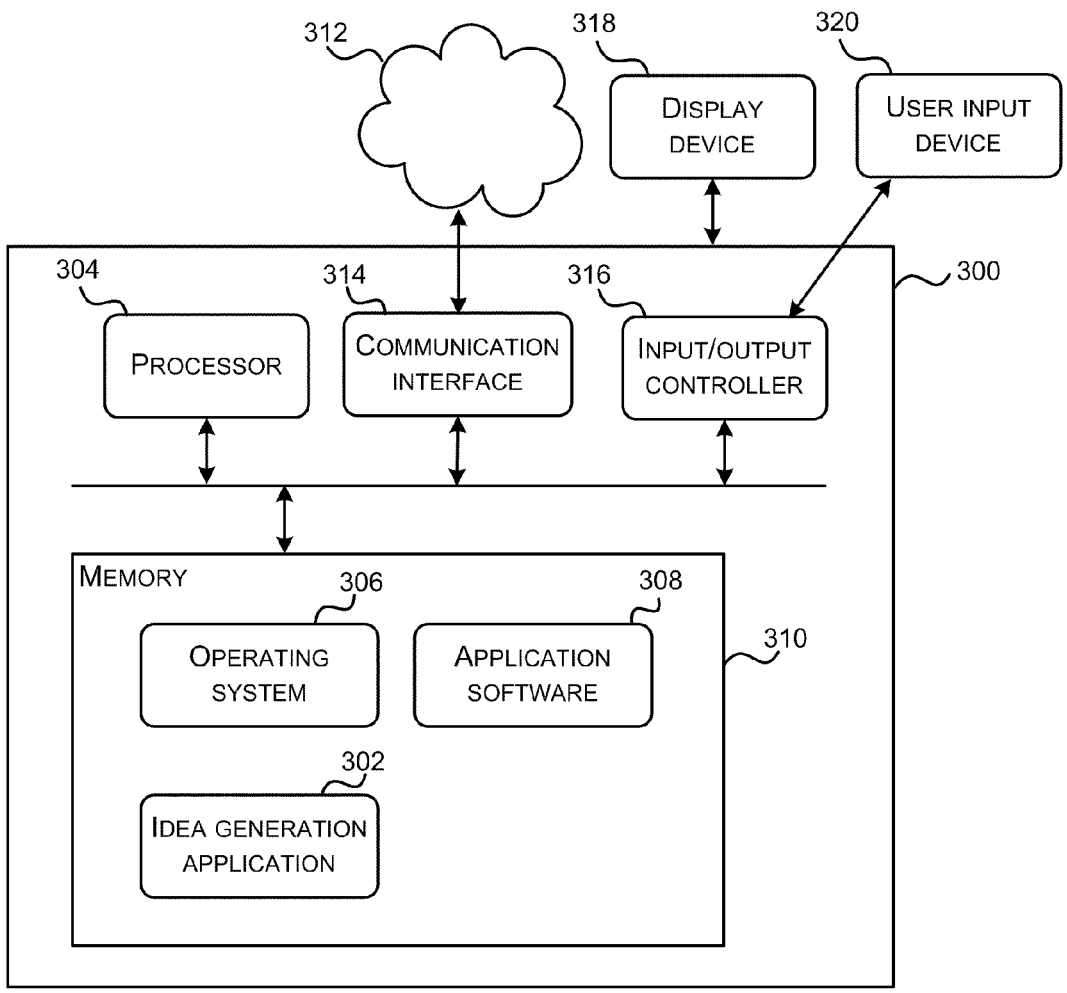
FIG. 3 illustrates an exemplary computing-based device arranged to run an idea generation application.

FIG. 3 illustrates various components of an exemplary computing-based device 300 which may be implemented as any form of a computing and/or electronic device, and which may run the idea generation application 302 described herein.

Computing-based device 300 comprises one or more processors 304 which may be microprocessors, controllers or any other suitable type of processors for processing computing executable instructions to control the operation of the device in order to run the idea generation application 302. Platform software comprising an operating system 306 or any other suitable platform software may be provided at the computing-based device to enable application software 308, including the idea generation application 302, to be executed on the device.

The computer executable instructions may be provided using any computer-readable media that is accessible by computing based device 300. Computer-readable media may include, for example, computer storage media such as memory 310 and communications media. Computer storage media, such as memory 310, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 310) is shown within the computing-based device 300 it will be appreciated that the storage may be distributed or located remotely and accessed via a network 312 or other communication link (e.g. using communication interface 314).

The computing-based device 300 also comprises an input/output controller 316 arranged to output display information to a display device 318 which may be separate from or integral to the computing-based device 300. The display information provides a graphical user interface for the idea generation application 302 (e.g. as shown in FIG. 1). The input/output controller 316 is also arranged to receive and process input from one or more devices, such as a user input device 320 (e.g. a mouse, keyboard or stylus). This user input defines the user-generated sketch (in block 202 of FIG. 2) and any updates to the sketch (in block 206). The user input may also be used for other forms of interaction with the idea generation application (e.g. to deform the workspace or manipulate content, as described below). In an embodiment the display device 318 may also act as the user input device 320 if it is a touch sensitive display device (e.g. as shown in FIG. 1). The input/output controller 316 may also output data to devices other than the display device, e.g. a locally connected printing device (not shown in FIG. 3).

Although the device in FIG. 3 is shown as being connected directly to the display device 318 and user input device 320, in some examples, the device 300 may comprise a server and the graphical user interface of the idea generation application 302 may be displayed on one or more remote displays and inputs may be provided by one or more remote user input devices (e.g. the display and user input device associated with a user's computer which accesses the application running on the server). In such an example, the communication interface 314 may provide a link, via network 312, to the remote users' computers.

Figure 4:
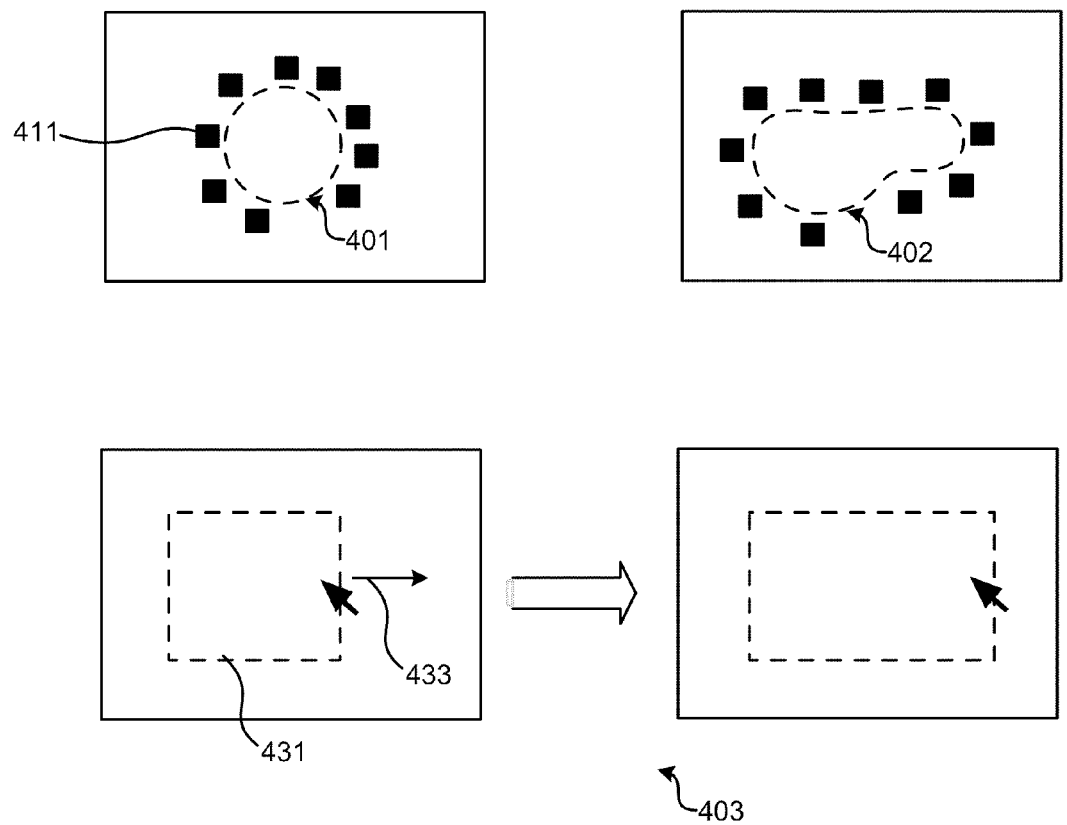
FIGS. 4, 6, 8, 10 and 11 show further examples of graphical user interfaces of an idea generation application.

The workspace 105 in FIG. 1 is shown as being rectangular in shape; however this is just an example of the shape of the workspace which may be of any shape, e.g. circular 401 or irregular 402, as shown in FIG. 4. Furthermore, the content may also be arranged in any manner outside the workspace. In the example of FIG. 1, the content is arranged linearly across the top of the user interface; however in the first two examples in FIG. 4, the content (as indicated by the squares 411) is arranged around the workspace and in some examples may be arranged tightly around the workspace.

Use of an irregular shaped workspace in combination with arranging the content around the workspace has the effect that the content can be placed close to the sketch. This can be demonstrated by reference to FIG. 6 where the workspace is irregular in shape and as a result the content is close to the sketch. If however, a rectangular workspace was provided around the sketch of FIG. 6, this would push the content much further away from the sketch in some areas (e.g. in the top left corner and the bottom right corners of the workspace 605 where there would be considerable blank canvas within the workspace). By placing the content close to the sketch, the content is placed in context (particularly where the content is the result of a search based on a particular portion of the sketch, such as a newly added part of the sketch).

Figure 5:
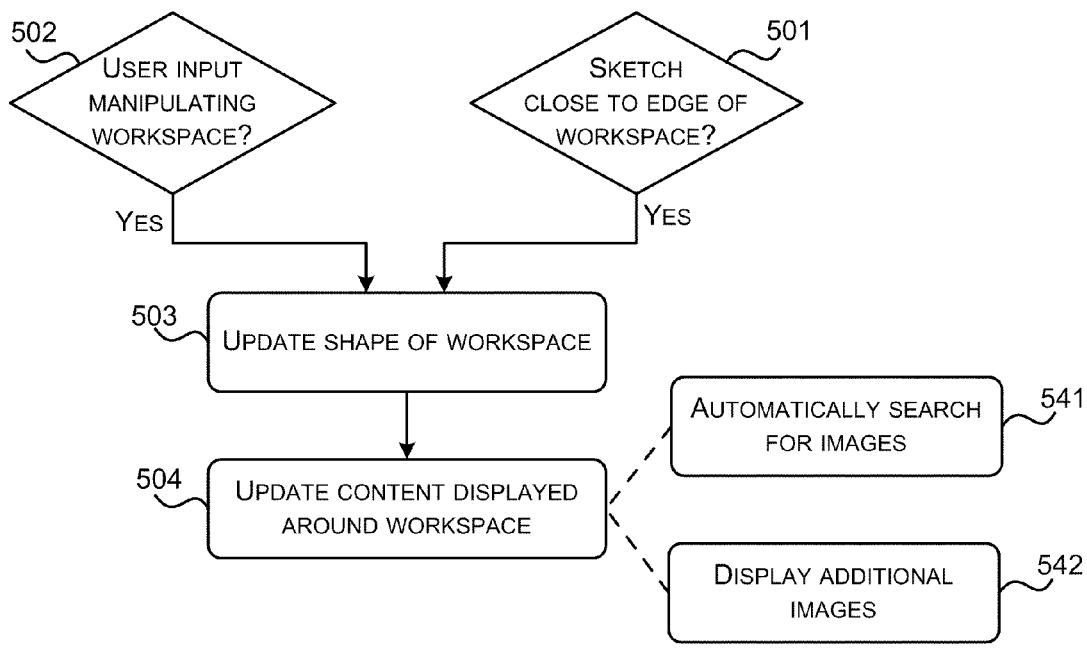
FIGS. 5, 7 and 9 show flow diagrams of further aspects of methods of operation of an example idea generation application.

FIG. 5 shows a flow diagram of further aspects of a method of operation of an example idea generation application, which includes a deformable workspace. The workspace may be deformable either in response to the sketch getting close to the edge of the workspace ('Yes' in block 501) or as a result of a user manipulating the workspace ('Yes' in block 502), e.g. through dragging the boundary of the workspace, as shown in example 403 in FIG. 4. In this simple example, a user deforms the shape of the workspace 431 by placing a cursor 432 on a part of the boundary and dragging it sideways (as indicated by arrow 433) and in another example, where the display is touch sensitive, a user may deform the workspace by placing their finger(s) on the boundary and then dragging the boundary around. In either situation (i.e. user manipulation or the sketch getting close to the workspace boundary), the shape of the workspace is updated (block 503). Where the change in shape is due to a user input (in block 502), the new shape will be dependent on the particular user manipulation and where the change in shape is due to the sketch being close to the edge of the workspace (in block 501), the updated shape will be dependent on the shape and size of the sketch. In an example, where the sketch gets close to the boundary of the workspace, the corresponding edge may be moved a fixed distance outwards (i.e. away from the sketch).

In an example where the content is displayed around the edge of the workspace, changing the shape of the workspace (in block 503) may increase or decrease the space around the workspace for displaying content and consequently the content displayed may be updated (block 504). Where the space around the workspace increases, this may comprise automatically searching for additional images (block 541) and displaying additional images around the workspace (block 542) in the additional space created by the change in shape of the workspace. In other examples, the entire content displayed around the workspace may be updated (in blocks 541-542) irrespective of whether the space around the workspace has changed or not.

The use of a deformable workspace, as described above, emphasizes the fact that the content is dynamically growing and in the examples where the content is updated (in blocks 541-542) the application enables a user to explore additional content by manually deforming the workspace. A user may be able to trigger a new search by manually deforming the workspace and may be able to locally change the search emphasis/results (e.g. for results displayed around the deformed portion of the workspace boundary). Additionally, through use of a deformable workspace, the application can provide a changing balance between workspace and additional information (and in some examples, interface components), which responds dynamically to a change in shape and/or size of the user-generated sketch. The problem of 'wasted' workspace is exacerbated by the divergence of device form-factors (e.g. large wall displays, desktop monitors and small tablet or mobile devices) and the use of a deformable workspace (possibly in combination with an irregular shaped workspace) enables the application to adapt to the particular device form factor being used.

Figure 6:
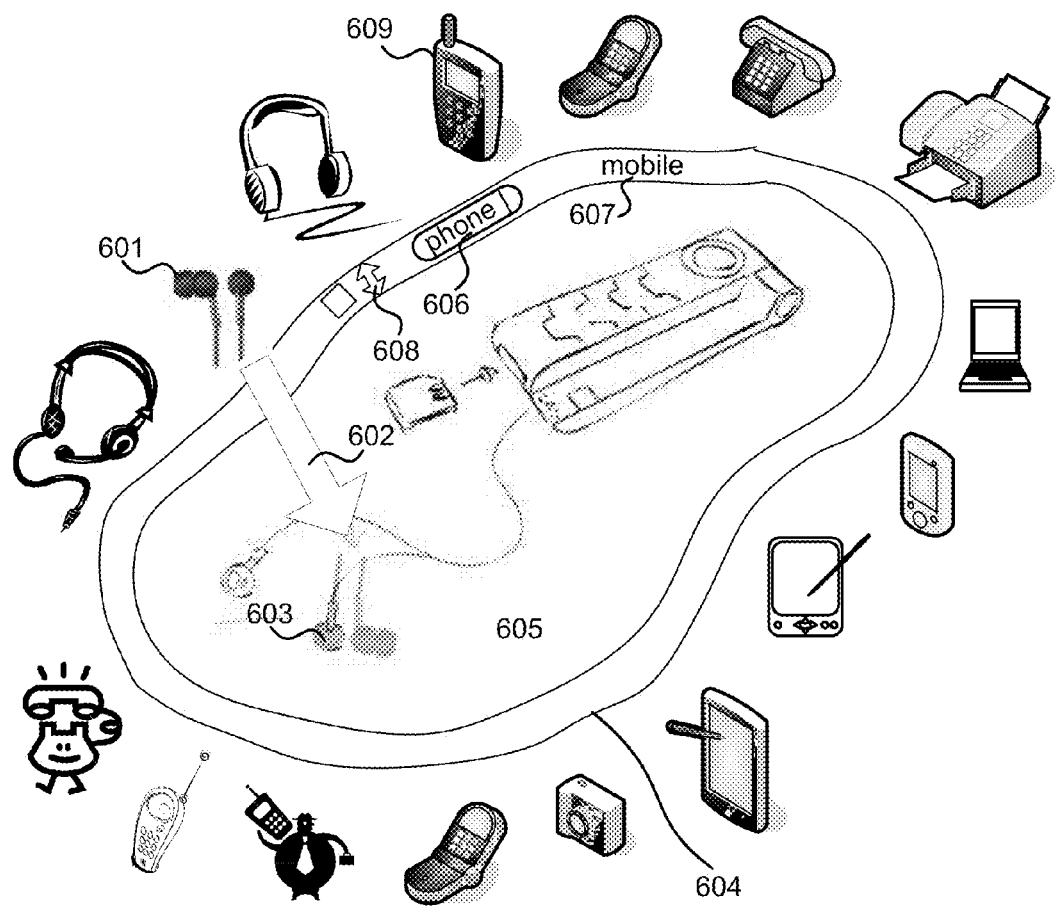
Figure 7:
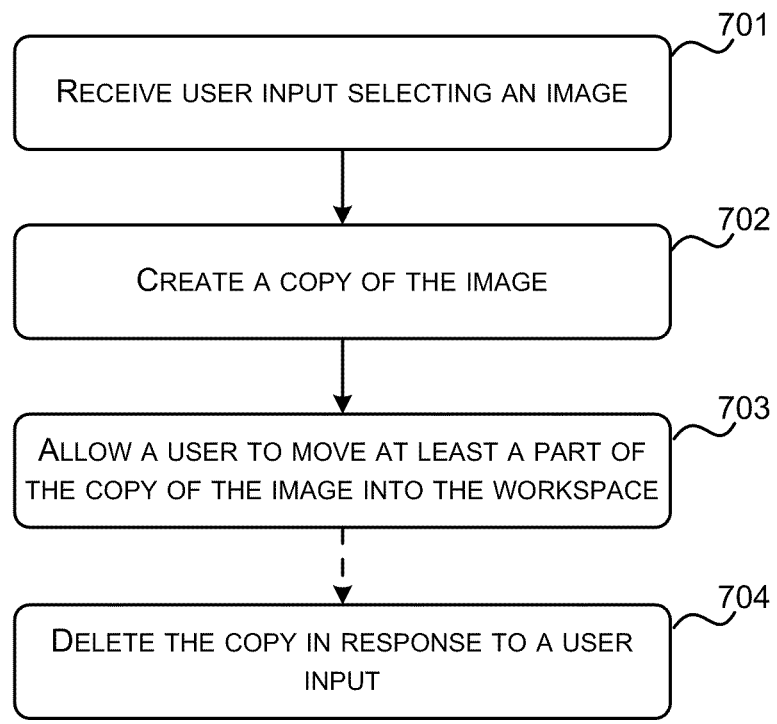

In addition to assisting in the creative process of generating ideas, the content displayed may be manipulated by the user in some examples to aid the sketching process, as shown in FIGS. 6 and 7. In a first example, an image may be selected and used to trace a specific part of the particular image, as shown in FIG. 6. FIG. 6 shows an image 601 of an ear piece which has been dragged into the sketch, as indicated by arrow 602. A user can then trace the outline 603 of the ear piece. In an example, when content such as image 601 is used within the sketch it may be depicted in a layer behind the actual sketch to assist with the tracing and also so that it may (easily) be deleted when it is no longer required (e.g. using an erase function within the application which may also be used to erase parts of the user-generated sketch if required). In a second example of user manipulation of content, a user may include images or parts of images within the sketch, either as a complete part (i.e. instead of drawing an item) or as a color or pattern fill (e.g. inside the tracing 603 of the ear piece as shown in FIG. 6). It will be appreciated that the results 601, 609 shown in FIG. 6 are depicted as simple line drawings and may show repeated results. This is by way of explanation only and in use, the results shown may include full color images and more complex images. The same applies to FIGS. 8, 10 and 11.

FIG. 7 shows a flow diagram of further aspects of a method of operation of an example idea generation application, which enables content to be manipulated by a user. In response to receiving an input selecting an image (block 701), a copy of the image is created (block 702) and the application then allows a user to move at least a part of the image copy into the workspace (block 703). In some instances, the part of the image moved into the workspace will be subsequently deleted (block 704) but in other situations, the image may remain as part of the user-generated sketch.

In another example of content manipulation, a user may be able to flag or bookmark particular images within the displayed content. For example, a user may be able to 'fix' an image within the displayed content so that when the content is updated, the image continues to be displayed. In another example, a user may be able to trigger a copy of an image to be stored in a local database, such as database 107 in FIG. 1, (or other specified repository), e.g. to form a local scrapbook or library of interesting content.

In some examples, the user interface of the idea generation application may include a membrane or ribbon shaped user interface 604 around the edge of the workspace 605, as shown in FIG. 6. The membrane provides some basic interaction functionality, such as an input area 606 for a search query, an indication of any search queries 607 preceding the current one and other controls 608 which may, for example, be used to display/hide the content being displayed, increase/decrease the number of result layers (see description below), set search parameters, e.g. to include or exclude certain types of images from the search results (e.g. still images and/or videos), to identify certain sources for searching (e.g. local database or an online repository). Further examples of controls 608 which may be included within the membrane include other basic search controls (e.g. a button to trigger a new search to refresh the content displayed) and/or basic drawing controls for sketching (e.g. pen selection, line thickness/color, eraser).

Although the membrane is shown in FIG. 6 as going all the way around the workspace, it will be appreciated that this is one example of the membrane. In another example, the membrane may extend around a portion of the edge of the workspace.

The user-generated sketch (e.g. as input in block 202 or 206 in FIG. 2) may comprise drawings, as shown in FIGS. 1 and 6, and may in addition comprise a handwritten annotation (or several annotations). Any annotations may be used in searching for content (e.g. in blocks 204 and 208 of FIG. 2 and block 541 of FIG. 5) in addition to or instead of using the drawing. Handwriting recognition software may be used to convert the handwritten annotation to text and then the text may be used in searching for image results.

The searches for images (e.g. in any of blocks 204, 208 and 541) may be based on the entire user-generated sketch or on a part of the sketch. In a first example, the additional search in block 208 may be based on the new part of the sketch which was added in the input received in block 206. This may mean that the results of the additional search may be different from the results of the previous search.

In a second example, the search to update content in block 541 of FIG. 5 following the deformation of the workspace may be based on the portion of the sketch which is closest to the area of deformation of the workspace boundary. This means that where the workspace is deformed due to the sketch getting close to the edge of the workspace, the search for new content may be based on the portion of the sketch which was closest to the edge of the workspace prior to deformation. In this example, the content displayed may comprise the results of multiple searches with specific parts of the sketch influencing the results that surround the particular area. This may have the effect of displaying very different sets of results which provide a range of inspiration triggers for users.

In a further example, the user may be able to define the portion of the sketch which is to be used as basis for the search. In such an example, the user may be able to highlight a part of the sketch (e.g. by drawing a box or boundary around the particular part) to be used when searching for content. This may be particularly useful where there are a number of handwritten annotations on the sketch, such that a user and select a subset of the annotations to form the basis of a search for updated content.

Figure 8:
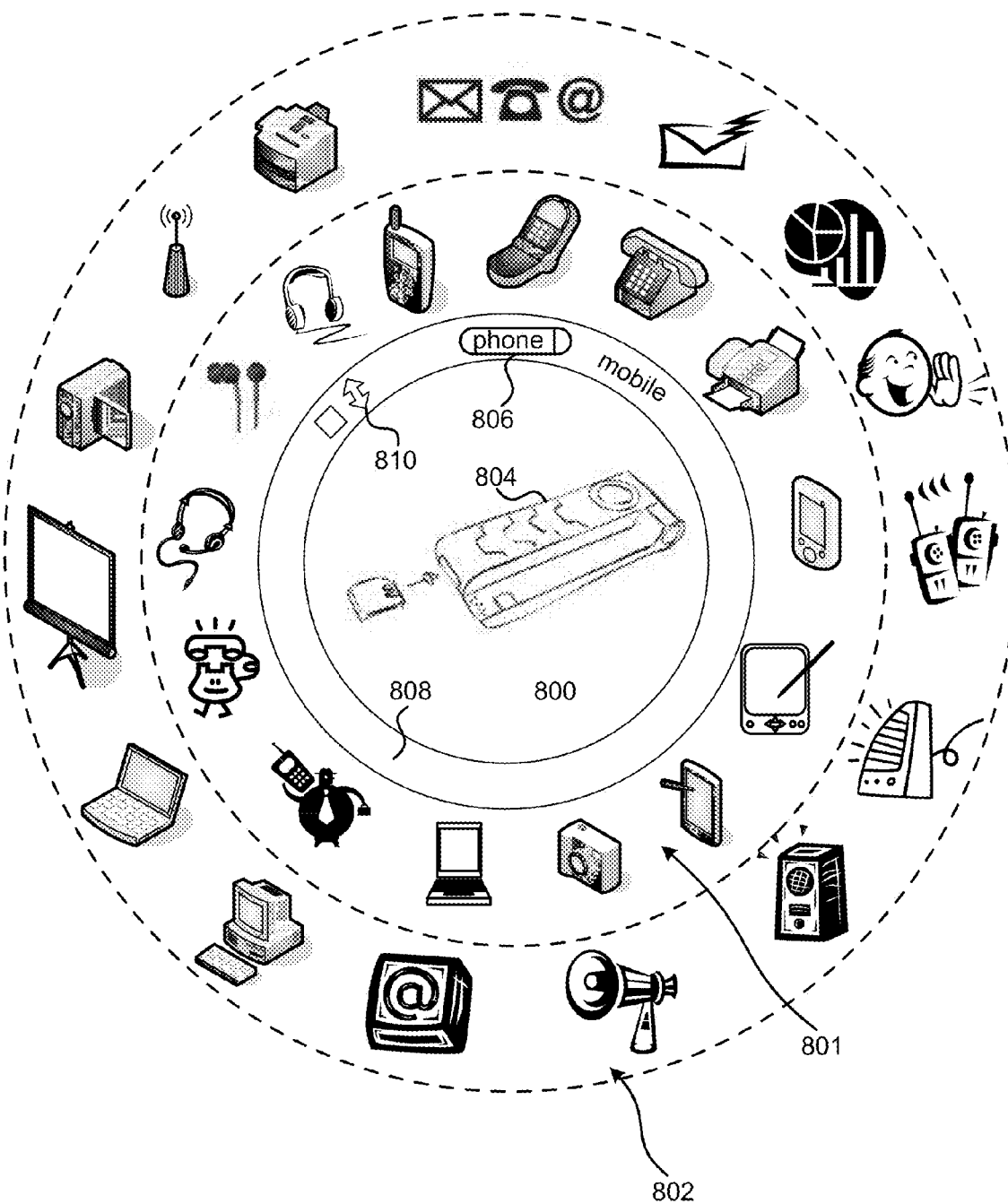

In performing a search for content, the application may perform a single search or may perform multiple searches using different search parameters (or search strategies) for each search. Where multiple searches are performed the results may be displayed in layers, with different layers corresponding to different searches, as shown in FIG. 8. FIG. 8 shows another example of the graphical user interface of an idea generation application, which comprises a workspace 800 surrounded by two layers, 801, 802 of image results. It will be appreciated that FIG. 8 shows just one way in which the different layers of results may be displayed.

In an example, different searches may search different image repositories e.g. a local database or an online repository. In another example, the different search parameters/strategies used to generate the different layers may have the effect that results in subsequent layers are less directly connected to the original search query (based on the sketch 804 or the textual search input 806 in the membrane 808). In an example of this, a layer may show contradictions or deviations of the initial search query. Where textual searching is used, a second search may use a keyword which is an opposite of the original search term. Other forms of deviating from the original search query (whether a textual string or graphical sketch) may alternatively be used (e.g. using the terminology or principles from the Harvey cards or from IDEO method cards). As described above, the membrane 808 may include a control 810 to allow a user to increase/decrease the number of result layers which are displayed. In a further example, the membrane may include a control to enable a user to choose the direction of deviation (e.g. by selecting a word from the Harvey cards).

Figure 9:
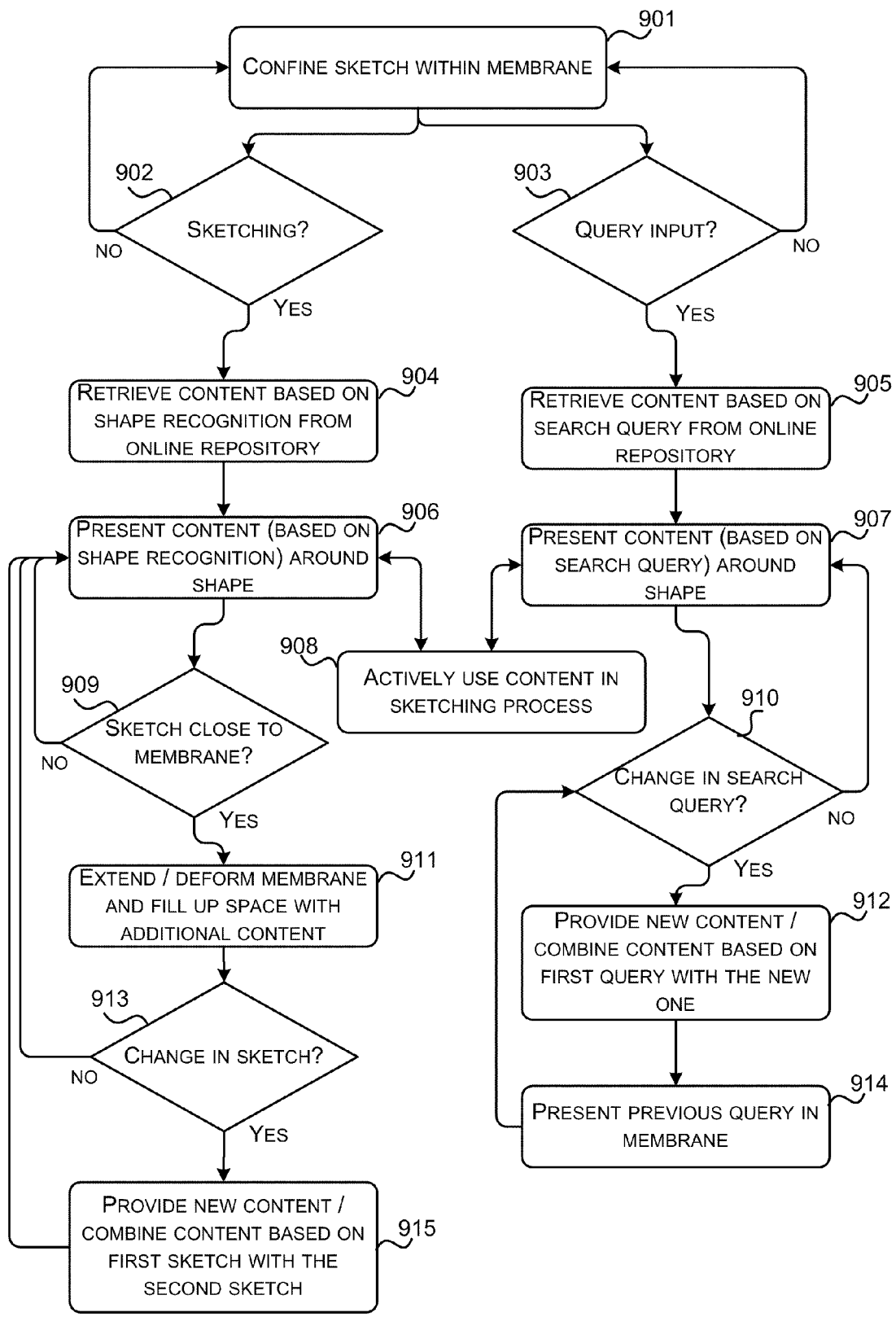

FIG. 9 shows a flow diagram of another example method of operation of an idea generation application. In this example, the searching may be triggered by a user sketching within the workspace or by a user inputting a text query term (e.g. into the query box 806 shown in FIG. 8 or through a handwritten annotation within the workspace). Initially, the user interface provides a workspace for user creation of a sketch which is confined (or surrounded) by a membrane (block 901) and at this initial stage no searching has been performed and consequently there are not any results displayed around the membrane. In this method, the searching for content (in blocks 904-905) may be triggered either by a user sketching in the workspace ('Yes' in block 902) or by a user providing a textual query input ('Yes' in block 903). Where a user sketches in the workspace ('Yes' in block 902), content is retrieved based on shape recognition and this content may be retrieved from online repositories such as Bing™, YouTube (trade mark) or Flickr® etc (block 904). Similarly, where a user provides a textual query input ('Yes' in block 903), content is retrieved from online repositories based on the input search query (block 905).

The retrieved content (from block 904 or 905) is then presented around the membrane (blocks 906-907) and where both sketching and search queries are input, the content displayed may be a combination of that retrieved in each search (i.e. a combination of that retrieved in blocks 904-905). The application further enables a user to actively use any of the content presented as part of the sketching process (block 908), e.g. through tracing or cutting out and including a portion of an image in the sketch.

If the original sketch is close to the membrane, or subsequent updates to the sketch mean that it gets close to the membrane ('Yes' in block 909), the membrane is deformed (which generally results in an extension of the membrane) and the additional space around the membrane is populated with additional content (block 911). If the sketch changes ('Yes' in block 913), new content is provided and this content may be combined with the content retrieved based on the original sketch (prior to the change) or may replace that content (block 915).

If the user inputs a new search query ('Yes' in block 910), new content is retrieved and similarly this may be displayed in combination with the previously displayed content or may replace this previously displayed content (in block 912). The previous query term is displayed within the membrane (block 914), e.g. as shown in FIG. 8.

Figure 10:
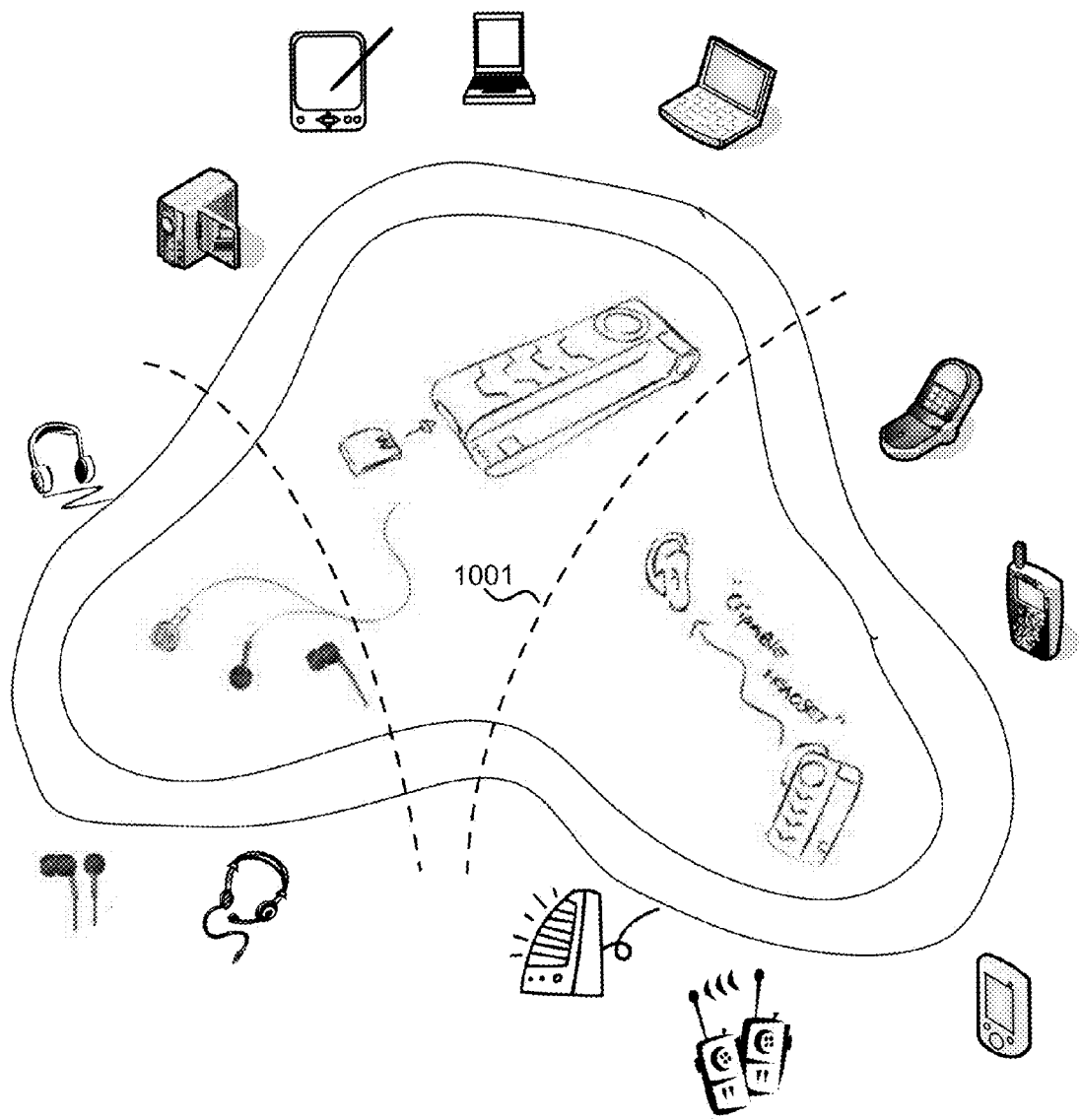
Figure 11:
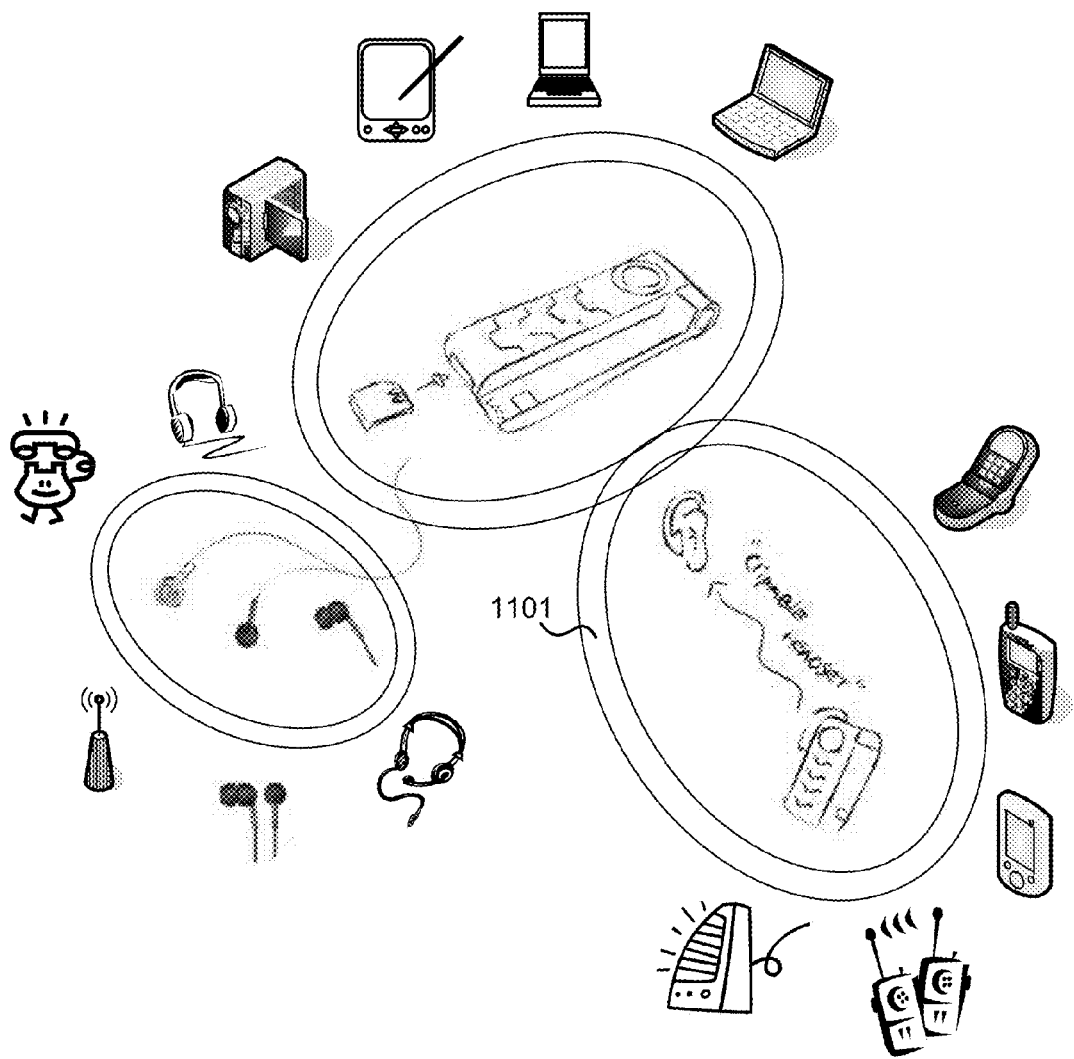

In FIGS. 4, 6 and 8 the content is shown all around the workspace. However, where the sketch becomes large or through the result of multiple users updating the sketch in different directions within the workspace, as shown in FIG. 10, separate clusters of content may be provided around (or close to) different parts of the sketch. In such an instance, each cluster of content may be generated through a search based on the part of the sketch which is associated with (e.g. local to) the cluster. In the example of FIG. 10, the workspace is divided conceptually into three clusters by the dotted lines 1001 (which would not be visible to a user in the user interface). The clusters may be generated automatically by the application and/or the user may be able to define the clusters. In further examples, the membrane itself may form local 'bubbles' 1101 around different parts of the sketch with content around each bubble which comprises results from a search based on the part of the sketch within the corresponding bubble, as shown in FIG. 11. In such an example, a user may be able to combine bubbles together and thereby trigger a new search for results to display.

There are many different ways in which the image searching may be performed (e.g. in blocks 204, 208 and 541). In an example, image based searching may be used to search for images which are similar visually to the sketch. In another example, image recognition software may be used to analyze the sketch and identify one or more textual search terms which may then be used to perform a search for images. In addition to using one or both of these techniques, as described above, handwriting recognition may be used to interpret any handwritten annotations within the sketch and provide further textual search terms.

The output of the idea generation application, i.e. a user-generated sketch which may be augmented with parts of images, may be saved in a file format which enables it to be transferred between machines and/or between users so that it can be updated at a later time using the idea generation application. The output may also include some or all of the content displayed at the point that the output is saved (e.g. the flagged content or all the currently displayed content may be saved into a separate file).

As the application runs, the history of the design process may be recorded, e.g. snapshots may be captured periodically which show both the current status of the sketch and the currently displayed content around the workspace. A user may then be able to replay the snapshots (e.g. in the form of a short movie) to review the creative process. The same information may alternatively be stored in a different manner, e.g. in the form of data defining the current status of the user-generated sketch and a list of the currently displayed content.

As described above, the application may be used in a single user or multi-user scenario. In a multi-user scenario, the multiple users may be viewing the GUI on a single display (as shown in FIG. 1) or on multiple displays and may be located in a single place or may be in different places (even if that is just different offices within one company). The application is not tied to a specific form factor and may be used on multiple different types of devices.

There are many different applications of the idea generation application described above. It may, for example, be used to design a new product or service or to develop new uses for a product. The application may be used as part of a professional design processes and/or for general, personal creative explorations (e.g. in a home or education environment).

The above described provides various examples of an idea generation application which combines two steps in design which previously have been performed separately (idea stimulation and idea rendition) in a seamless process. Although the present examples are described and illustrated herein as being implemented as a locally run application on a computing system, the system described is provided as an example and not a limitation. As those skilled in the art will appreciate, the present examples are suitable for application in a variety of different types of computing systems and the application may run remotely (e.g. on a server).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
providing, by a computer, a deformable workspace in a user interface for a user-generated sketch;
after receipt of a user input defining the user-generated sketch, automatically performing a search for images based on the user-generated sketch;
displaying image results from the search outside the deformable workspace within the user interface;
automatically performing an additional search in response to a change in the user-generated sketch;
displaying additional image results based at least in part on the additional search;
in response to a user input manipulating an edge of the deformable workspace, updating a shape of the deformable workspace based on the user input manipulating the edge; and
updating the image results displayed around the deformable workspace in response to updating the shape of the deformable workspace, updating the image results displayed around the deformable workspace in response to updating the shape of the deformable workspace including:
automatically performing an updated search for images based on the user-generated sketch; and
displaying updated image results outside the workspace within the user interface.

2. A method according to claim 1, further comprising:
if the user-generated sketch is within a defined distance of an edge of the deformable workspace, increasing the size of the deformable workspace.

3. A method according to claim 1, further comprising:
providing functionality within the user interface to enable a user to manipulate an image to include the image into the deformable workspace.

4. A method according to claim 3, wherein providing the functionality within the user interface to enable the user to manipulate the image to include the image into the deformable workspace comprises:
in response to receiving a user input selecting the image, creating a copy of the image; and
providing additional functionality within the user interface to enable the user to move at least a part of the copy of the image into the deformable workspace to form a part of the user-generated sketch.

5. A method according to claim 1, wherein the deformable workspace has an irregular shape.

6. A method according to claim 1, wherein displaying image results from the search outside the deformable workspace within the user interface comprises:
displaying image results from the search around the deformable workspace.

7. A method according to claim 1, further comprising:
providing a ribbon-shaped user interface boundary between the image results and the deformable workspace, the ribbon-shaped user interface boundary comprising a user interaction element.

8. A method according to claim 7, wherein the user interaction element comprises a text input box and wherein the method further comprises:
on receipt of a user input via the text input box defining a search query, automatically performing an updated search for images based on the search query,
and wherein displaying image results from the search outside the deformable workspace within the user interface comprises displaying updated image results based at least in part on the search query.

9. A method according to claim 1, further comprising:
on receipt of a user input defining a handwritten annotation within the user-generated sketch, converting the handwritten annotation to text, automatically performing an updated search for images based on the text, and displaying updated image results from the updated search outside the workspace within the user interface.

10. A method according to claim 1, further comprising:
automatically performing an updated search based on the user-generated search and different search parameters; and
displaying updated image results outside the deformable workspace, the updated image results being generated by the second updated search.

11. A method comprising:
providing, by a computer, a workspace in a user interface for creation of a user-generated sketch;
after receipt of a user input defining a user-generated sketch, automatically performing a search for images based on the user-generated sketch;
displaying image results from the search outside the workspace within the user interface;
providing functionality within the user interface to enable a user to manipulate the image results to include at least a part of the image results into the workspace, providing the functionality within the user interface including:
in response to receiving a user input selecting an image result, creating a copy of the image result; and
providing additional functionality within the user interface to enable the user to move at least a part of the copy of the image result into the workspace to form a part of the user-generated sketch;
automatically performing an additional search for images in response to changes in the user-generated sketch based on the inclusion of the at least part of the image results; and
displaying additional image results from the additional search.

12. A method according to claim 11, wherein the workspace has an irregular shape.

13. A method according to claim 11, wherein displaying the image results from the search outside the workspace within the user interface comprises:
    displaying the image results from the search around the workspace.

14. One or more tangible device-readable media with device-executable instructions that, when executed by a computing system, direct the computing system to perform operations comprising:
    providing an irregular shaped workspace in a user interface for a user-generated sketch;
    after receipt of a user input defining the user-generated sketch, automatically performing a search for images based on the user-generated sketch;
    displaying image results from the search around the irregular shaped workspace within the user interface;
    receiving an update to the user-generated sketch, receiving the update to the user-generated sketch including:
        receiving a user manipulation of the image results to include at least a part of the image results into the workspace, receiving the user manipulation of the image results to include the at least part of the image results into the workspace including:
            in response to receiving a user input selecting an image result, creating a copy of the image result; and
            receiving an indication of the user moving at least a part of the copy of the image result into the workspace to form a part of the user-generated sketch;
    automatically performing an additional search in response to the update to the user-generated sketch; and
    updating the image results displayed based on the additional search.

15. One or more tangible device-readable media according to claim 14, further comprising device-executable instructions that, when executed by the computing system, direct the computing system to perform an operation comprising:
    providing functionality within the user interface to enable a user to manipulate an image result to include at least a part of the image result into the irregular shaped workspace.

16. One or more tangible device-readable media according to claim 14, further comprising device-executable instructions that, when executed by the computing system, direct the computing system to perform operations comprising:
    if the user-generated sketch is within a defined distance of a moveable edge of the irregular shaped workspace or in response to a user input manipulating a moveable edge of the irregular shaped workspace, updating a shape of the irregular shaped workspace based on the defined distance or the user input; and
    updating the image results displayed around the irregular shaped workspace.

17. A method according to claim 11, wherein if the user-generated sketch is within a defined distance of an edge of the workspace, increasing the size of the workspace.

18. A method according to claim 11, wherein the workspace is deformable.

19. A method according to claim 11, further comprising:
    providing a ribbon-shaped user interface boundary between the image results and the deformable workspace, the ribbon-shaped user interface boundary comprising a user interaction element.

20. One or more tangible device-readable media according to claim 17, wherein the irregular workspace is deformable.

* * * * *